US010892660B2

(12) United States Patent
Juris et al.

(10) Patent No.: US 10,892,660 B2
(45) Date of Patent: Jan. 12, 2021

(54) ELECTRICAL MACHINE AND METHOD FOR MANUFACTURING AN ELECTRICAL MACHINE

(71) Applicant: AUDI AG, Ingolstadt (DE)

(72) Inventors: Peter Juris, Ingolstadt (DE); Korbinian Weber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 365 days.

(21) Appl. No.: 15/942,838

(22) Filed: Apr. 2, 2018

(65) Prior Publication Data

US 2018/0323672 A1 Nov. 8, 2018

(30) Foreign Application Priority Data

May 8, 2017 (DE) .................... 10 2017 207 659

(51) Int. Cl.
| | | |
|---|---|---|
| *H02K 3/24* | (2006.01) | |
| *H02K 3/42* | (2006.01) | |
| *H02K 3/18* | (2006.01) | |
| *H02K 3/14* | (2006.01) | |
| *H02K 15/04* | (2006.01) | |
| *H02K 9/10* | (2006.01) | |
| *H02K 9/02* | (2006.01) | |
| *H02K 9/08* | (2006.01) | |

(52) U.S. Cl.
CPC ............... *H02K 3/42* (2013.01); *H02K 3/14* (2013.01); *H02K 3/18* (2013.01); *H02K 3/24* (2013.01); *H02K 15/0421* (2013.01); *H02K 9/02* (2013.01); *H02K 9/08* (2013.01); *H02K 9/10* (2013.01)

(58) Field of Classification Search
CPC ............ H02K 3/42; H02K 15/04; H02K 3/14; H02K 15/0421; H02K 3/18; H02K 3/24
See application file for complete search history.

(56) References Cited

U.S. PATENT DOCUMENTS

| | | | |
|---|---|---|---|
| 2,568,169 | A | 9/1951 | Raczynski |
| 3,270,229 | A | 8/1966 | Ruelle et al. |

(Continued)

FOREIGN PATENT DOCUMENTS

| | | |
|---|---|---|
| CN | 104953729 A | 9/2015 |
| DE | 666920 C | 10/1938 |

(Continued)

OTHER PUBLICATIONS

German Examination Report, dated Mar. 14, 2018, in corresponding German Application No. 102017207659.3; 20 pgs.

(Continued)

*Primary Examiner* — Tran N Nguyen
*Assistant Examiner* — Leda T Pham
(74) *Attorney, Agent, or Firm* — Maier & Maier, PLLC

(57) ABSTRACT

An electrical machine with a rotor and a stator. The rotor or the stator has at least one coil with a coil core and a coil winding, which surrounds the coil core. The coil winding has at least one turn that is formed from a flat conductor, which is bent a around a plurality of bending axes, which are spaced apart from one another and are parallel, and, as viewed in section, is S-shaped and/or has a meandering shape. The flat conductor has a plurality of layers that are insulated from one another, at least in regions, and/or a plurality of slot-shaped recesses.

9 Claims, 5 Drawing Sheets

(56) References Cited

U.S. PATENT DOCUMENTS

| | | | | |
|---|---|---|---|---|
| 4,446,393 | A | * | 5/1984 | Finegold .............. H02K 3/18 310/184 |
| 6,806,612 | B2 | | 10/2004 | Nakamura et al. |
| 7,969,274 | B2 | | 6/2011 | Brennan et al. |
| 8,671,555 | B2 | * | 3/2014 | Kamatani ......... H02K 15/0478 242/365.3 |
| 10,432,051 | B2 | * | 10/2019 | Hirabayashi ............ H02K 1/08 |
| 2002/0096946 | A1 | | 7/2002 | Bisschops |
| 2006/0028074 | A1 | | 2/2006 | Komura et al. |
| 2008/0007133 | A1 | | 1/2008 | Onimaru et al. |
| 2009/0195106 | A1 | | 8/2009 | Iki et al. |
| 2010/0001610 | A1 | | 1/2010 | Iki et al. |
| 2010/0164319 | A1 | * | 7/2010 | Metsberg ................ H02K 3/18 310/208 |
| 2012/0086296 | A1 | | 4/2012 | Cleveland |
| 2014/0159538 | A1 | | 6/2014 | Hasegawa et al. |
| 2015/0280503 | A1 | * | 10/2015 | Takahashi .............. H02K 3/50 310/201 |

FOREIGN PATENT DOCUMENTS

| | | | |
|---|---|---|---|
| DE | 1463852 | A1 | 1/1969 |
| DE | 2409681 | A1 | 9/1975 |
| DE | 69909604 | T2 | 6/2004 |
| DE | 102012021114 | A1 | 4/2014 |
| DE | 102013204047 | A1 | 9/2014 |
| DE | 112015001564 | T5 | 2/2017 |
| DE | 102016004745 | B4 | 5/2018 |
| EP | 0 662 699 | A1 | 7/1995 |
| GB | 191329274 | A | 2/1915 |
| GB | 1062669 | A | 3/1967 |
| JP | S55-132007 | A | 10/1980 |
| JP | S59-23510 | A | 2/1984 |
| JP | H04-338614 | A | 11/1992 |
| JP | 3054231 | B2 | 6/2000 |
| WO | 2014063673 | A2 | 5/2014 |
| WO | 2016044408 | A1 | 3/2016 |

OTHER PUBLICATIONS

German Examination Report dated Mar. 15, 2019 in corresponding German Application No. 102017207659.3 including partial machine-generated English language translation; 8 pages.

Office Action dated Sep. 26, 2018 in corresponding European Application No. 18163253.0; 15 pages including partial English-language machine translation.

Office Action dated Dec. 2, 2019 in corresponding Chinese Application No. 201810425857.6; 15 pages including English-language translation.

Search Report dated Dec. 19, 2019 in corresponding European Application No. 18 163 253.0; 8 pages including partial machine-generated English-language translation.

Office Action dated Aug. 3, 2020 in corresponding Chinese Application No. 201810425857.6; 10 pages.

* cited by examiner

ELECTRICAL MACHINE AND METHOD FOR MANUFACTURING AN ELECTRICAL MACHINE

FIELD

The invention relates to an electrical machine with a rotor and a stator, wherein the rotor or the stator has at least one coil with a coil core and a coil winding surrounding the coil core. The invention further relates to a method for manufacturing an electrical machine.

BACKGROUND

The electrical machine serves for the conversion of electrical energy to mechanical energy or vice versa. In the first case, it works as an electric motor, in the latter case as a generator. It has the rotor and the stator, wherein the rotor is mounted so as to be able to move with respect to the stator and, in particular, to rotate. Either the rotor or the stator is equipped with the electrical coil, which, in turn, has the coil core and the coil winding. The coil core is preferably composed of a magnetizable material and serves for bundling of the magnetic flux that can be generated by means of the coil winding in order to thereby increase the inductance and/or the magnetic flux density of the coil. The coil core may also be referred to as an iron core, even when it does not necessarily consist of iron. Instead, it can fundamentally be composed of any magnetizable, in particular ferromagnetic, material.

During the operation of the electrical machine, electric current flows through the coil winding. In this regard, the coil winding has at least a first terminal and a second terminal, which are connected to each other by way of said coil winding. For operation of the electrical machine as an electric motor, the two terminals are connected at different electric potentials or such potentials are applied to them. During an operation of the electrical machine as a generator, the different potentials are established at the two terminals and can be tapped there.

In applications with high requirements placed on the torque or power density, the allowed current densities within the coil winding of electrical machines are being steadily increased. In this case, the current heat losses ensuing in the electrical machine represent a significant and often also the predominant part of the total losses of the electrical machine. Accordingly, regardless of the design of the electrical machine, aspects of the thermal load capacity are the focus of attention, in particular in the case of machines on which high demands are placed. On account of the temperature dependence on material sizes, it is already necessary when the electrical machine is dimensioned to develop a suitable cooing concept in order to ensure both the sought-after electromagnetic function and the required stability.

SUMMARY

The object of the invention is to propose an electrical machine that, in comparison to known electrical machines, has advantages and, in particular, makes possible a flexible design, the realization of an efficient cooling, and/or an energy-efficient operation in a cost-effective way.

This is achieved in accordance with the invention with an electrical machine having the features of the disclosure. It is provided in this case that the coil winding has at least one turn made of a flat conductor that is bent around a plurality of bending axes, which are spaced apart from one another and are parallel, and, as viewed in section, is S-shaped and/or has a meandering shape, wherein, for the reduction of eddy currents, the flat conductor has, at least in regions, a plurality of layers that are insulated from one another and/or a plurality of slot-shaped recesses.

The coil winding has exactly one or preferably a plurality of turns. In the latter case, the plurality of turns are electrically connected to one another in order to jointly form the coil winding. As already explained above, the coil winding has the first terminal and the second terminal at oppositelying ends. In the case of the plurality of turns, in this respect, the first terminal is provided at one of the turns and the second terminal is provided at another of the turns, wherein these two turns are electrically connected to each other either directly or only indirectly by way of at least one additional turn and preferably by way of a plurality of additional turns. The turn or at least one of the turns has the described configuration. More preferably, however, a plurality of the turns and, in particular, all of the turns, are configured in the way described. Insofar as only a single turn is addressed below, these statements can always be extended to other turns—insofar as they are provided.

The turn consists of the flat conductor or, expressed in more general terms, therefore, of a flat metal element that has markedly larger dimensions in two directions that are perpendicular to each other than in a third direction perpendicular to the two first-mentioned directions. In one of the first-mentioned directions, the flat conductor can have, in turn, markedly larger dimensions than in another of the first-mentioned directions.

The flat conductor preferably is present as a rolled product. Rolled products are characterized in that, in particular in comparison to products produced by casting technology, they have an especially high degree of purity, a high and uniform density of the material, and a high electrical conductivity. In addition, they have very smooth and clean surfaces and/or rounded edges.

For example, the flat conductor can be lacquered prior to being bent around the bending axes. On account of the very smooth surface, only one thin lacquer layer is needed, thereby making possible, on the one hand, a high energy density and, on the other hand, a good cooling of the coil. As material for the flat conductor, it is fundamentally possible to use any electrically conductive material. More preferably, however, copper or aluminum or a copper alloy or an aluminum alloy is used.

The turn is formed in one piece and is made of a uniform material. Obviously, in a preferred embodiment, this can also apply to the entire coil winding, composed of a plurality of turns. For the formation of the turn, the flat conductor is bent in such a way that, afterwards, it is—at least in plan view—S-shaped and/or it has a meandering shape. For example, for this purpose, it has a plurality of branches, which transition into one another by way of bends. Each of the branches is thus connected to an adjacent branch via one of the bends. An S shape is also understood to mean a shape that corresponds to or resembles an S that is mirrored around an axis as the main axis. In this respect, in plan view, the turn or the flat conductor has a so-called S twist.

As viewed in section, the branches are preferably directed parallel to one another, at least in regions; in particular, all branches of each turn are directed parallel to one another, at least in regions. The S shape is achieved, for example, with three branches per turn. For creation of the meandering shape, the flat conductor can serve for joint or simultaneous formation of a plurality of turns and, in particular, of all turns of the coil winding. The S-shaped or meandering-shaped form is achieved through bending around the plurality of bending axes that are spaced apart from one another and are parallel to one another.

In this case, the bending axes lie, for example, in a material plane of the flat conductor. In particular, prior to the bending, the bending axes lie in a plane that is spanned by the mutually perpendicular directions with the largest dimensions of the flat conductor. Especially preferred, each of the turns has at least two and, in particular, exactly two bending axes around which the flat conductor is bent. As viewed in section, the bending is preferably produced in such a way that a change in direction is realized. Therefore, the bend occurs by more than 90°, preferably by an angle of greater than 90° and at most 180°, preferably by 180°. In the latter case, as viewed in section, each of the bends is essentially U-shaped.

The coil is designed, for example, as a tooth coil; that is, it has a tooth-shaped coil core, which is surrounded by the coil winding. Alternatively, however, the coil winding may be present as part of a distributed winding of the electrical machine. For this purpose, the turns need to be adjusted correspondingly, and, in particular, furnished with corresponding terminals and/or insulated against one another. The insulation can be produced, for example, by way of coating or lacquering, reference to which has already been made above.

The flat conductor can fundamentally be formed monolithically; that is, it may be present as a continuous and uninterrupted element. Above all in regions in which many magnetic field lines penetrate the winding or the at least one turn of the coil, such as, for example, a scatter field in the vicinity of tooth heads, additional current heat losses can occur owing to parasitic eddy currents. Accordingly, it is of advantage when the flat conductor is shaped especially flat and/or narrow; that is, for example, it has a ratio between its two smaller dimensions that lies below a specific value.

However, flat conductors of this kind have a relatively low strength. Beyond this, during the electromagnetic layout of the electrical machine, the optimum material thickness of the flat conductor results from the number of turns and the available effective surface of the electrical machine. During stamping of the at least one turn or of the plurality of turns from a metal sheet or a metal sheet coil, relatively substantial waste can accrue on account of the target shape of the turn. Moreover, the handling and post-processing of the complex and generally filigreed geometry of the turn are complicated. Finally, the smallest dimension of the flat conductor is constant, so that no variation of these dimensions—for example, for different turns of the coil winding—is possible.

For this reason, for the reduction of eddy currents, the flat conductor should have either a plurality of layers, which, at least in regions, are insulated from one another, or a plurality of slot-shaped recesses. A combination of these configurations is obviously possible as well. For example, the flat conductor has at least two layers of this kind. Preferably, however, a larger number of layers is provided, namely, a number of at least five layers. The layers of which the flat conductor is composed are insulated against one another, at least in regions; that is, they are electrically separated from one another. Additionally or alternatively, the flat conductor can have the slot-shaped recesses.

If the plurality of layers are to be combined with the large number of slot-shaped recesses, then, it can be provided, for example, that at least some of the layers and preferably all of the layers of the flat conductor have respectively at least one recess and preferably a plurality of recesses. The layers are then arranged with respect to one another so as to form the flat conductor in such a way that the recesses or the edges of the recesses of the layers are arranged in alignment with one another or are arranged offset from one another. In the latter case, the offsetting of the recesses can occur in such a way that the recesses of two layers that directly rest against each other are arranged spaced apart from one other, as viewed in each direction, so that, in particular, the recesses are not in fluid connection with each other.

In addition, it can be provided that one of the layers in which at least one recess or a plurality of recesses is or are arranged rests respectively against one of the layers that is configured free of recesses, that is, has no recesses. Especially preferred, the flat conductor is formed from a plurality of layers, wherein layers that have recesses alternate with layers that are free of recesses.

A preferred embodiment provides that the flat conductor is present as a metal sheet or as a metal band. A metal sheet is preferably understood to mean a plate-shaped metal product. The metal band, in contrast, can have the same dimensions in cross section as the metal sheet, but is preferably configured as an endless product or rolled goods.

A preferred enhancement of the invention provides that the layers in a first terminal region and the layers in a second terminal region, which is spaced apart from the first terminal region, are electrically connected to one another, and, between the first terminal region and the second terminal region, are electrically insulated from one another, at least in regions, in particular continuously. The already mentioned first terminal is present in the first terminal region and the second terminal is present in the second terminal region. The layers in the two terminal regions are electrically connected to one another, respectively, and, in between, are electrically insulated from one another, at least in regions, in particular continuously. In the latter case, in this regard, the layers are electrically parallel to one another between their terminal regions.

If the coil winding has only the one turn, then the two terminal regions are present at this turn. However, if a plurality of turns of the coil winding are configured from the flat conductor, then the first terminal region lies preferably at one of the turns and the second terminal region at another of the turns. These two turns can be electrically connected to each other directly or else only indirectly by way of at least one additional turn. Preferably, the layers are present continuously over the turns, so that, for the plurality of turns, it therefore also holds true that the layers are electrically connected to one another only in the first terminal region and the second terminal region, whereas, between them, at least in regions and, in particular, continuously, they are electrically insulated from one another. It can therefore be provided that, for at least one of the turns, the layers of the flat conductor are electrically insulated from one another continuously and in this case are directed electrically parallel to one another.

Another especially preferred embodiment of the invention provides that the layers are firmly bonded to one another, in particular by soldering and/or by adhesive bonding. The soldering is provided, for example, in the first terminal region and/or in the second terminal region. The adhesive bonding can be provided in regions in which the layers are to be electrically insulated from one another. The adhesive bonding can be provided, for example, by means of a lacquer or the equivalent.

A preferred embodiment provides that the recesses in the flat conductor are formed with closed edges. This is understood to mean that, in at least one direction, the recesses have a continuous edge, which completely surrounds the respective recess. In this case, the recesses are arranged or formed spaced apart in at least one direction from edges of the flat conductor and do not pass through said edges. By means of an arrangement of the recesses of this kind, it is possible to create an especially efficient damping of eddy currents.

In the scope of another embodiment of the invention, it is provided that the recesses are formed as depressions passing into a surface of the flat conductor or as through openings passing through the flat conductor on both sides. Fundamentally, both embodiments serve for damping or interrupting eddy currents. In relation to a material thickness of the flat conductor, the depressions pass through, for example, at most 90%, at most 75%, at most 50%, or at most 25% of the flat conductor, and hence not completely in any case, so that the depressions have a continuous bottom. Alternatively, the recesses are present as through-passage openings, which pass through the flat conductor completely in one direction.

Another embodiment of the invention provides that at least two of the recesses are arranged overlapping in the direction of their longitudinal extension. The direction of their longitudinal extension is understood to mean the direction in which the dimensions respectively have their largest dimensions. In this direction, the two recesses are insofar arranged adjacent to each other. For example, a stacked arrangement of the recesses formed in the flat conductor is provided.

A preferred embodiment of the invention provides that the turn has a first contact branch that is arranged on a first side of the coil core and has a free edge protruding in the direction of the coil core, a second contact branch that is arranged on a second side of the coil core that lies opposite to the first side and has a free edge protruding in the direction of the coil core, as well as a connecting branch that connects the first contact branch and the second contact branch. Each turn therefore has the three mentioned branches, namely, the two contact branches and the connecting branch. Said branches are formed together in one piece and are made of a uniform material, wherein the configuration is provided from the metal sheet or metal band by the bending thereof around the bending axes.

The S shape of the turn, which, as viewed in section, is strongly compressed, is achieved in that the free edge of the first contact branch protrudes in a first direction and the free edge of the second contact branch protrudes in a second direction, which is opposite to the first direction. In this case, the first contact branch is present on the first side of the coil core and the second contact branch is present on the second side of the coil core, so that the contact branches are separated from each other by the coil core, as viewed in section. As viewed in section, the connecting branch is present between the two contact branches. This means that a plane, which is spanned by the mutually perpendicular directions in which the connecting branch has its largest dimensions, lies between the two contact branches.

Another preferred embodiment of the invention provides that the connecting branch is connected to the first contact branch by way of a first bend of the first contact branch and is connected to the second contact branch by way of a second bend of the second contact branch, wherein the first bend and the second bend are respectively bent around one of the bending axes. In this way, first bend is associated with the first contact branch and the second bend is associated with the second contact branch. By way of the respective bend, the corresponding contact branch is joined to the connecting branch. The connecting branch consequently lies between the bends and is preferably planar, in particular completely flat. Each of the bends is formed on account of a bend of the metal sheet or metal band around one of the bending axes that are spaced apart from one another and are parallel to one another.

In the scope of another embodiment of the invention, it is provided that, in the connecting branch, an open-edged or closed-edged coil core mount for the coil core is formed. It was already stated above that the two contact branches are to be arranged on opposite-lying sides of the coil core. In this case, they take up the coil core between them. In order to make it possible to place the coil winding or turn on the coil core, the connecting branch that connects the contact branches to each other now has the coil core mount. Said mount can be either open-edged or closed-edged in the connecting branch. In the first case, the coil core mount passes through at least one edge of the connecting branch, whereas, in the latter case, the edge of the coil core mount is continuously closed.

A preferred enhancement of the invention provides that, for the formation of the coil winding, a plurality of turns are arranged so as to rest against one another. This is the case, in particular, when the turn consists of the bent metal sheet, wherein each turn is produced separately. Subsequently, the separate turns are joined together to form the coil winding. Here, they are arranged such a way that they rest against one another. It can be provided in this case that the turns need to be pressed against one another only in such a way that an electrical connection is present between them. Obviously, however, it can also be provided, for example, that the turns are fastened to one another in a material bonded manner, in particular by soldering or the like.

It is provided, for example, that the first bend of one of the turns rests against the first bend of an adjacent turn. Additionally or alternatively, however, the first turn can also rest against the first contact branch, the second contact branch, and/or the connecting branch. Additionally or alternatively, the second bend of one of the turns rests against the second bend of the other turn. Here, too, however, a resting against the first contact branch, the second contact branch, or the connecting branch can be provided.

Another enhancement of the invention provides that the first contact branch is arranged in the region of the first bend and/or the second contact branch is arranged in the region of the second bend, spaced apart, respectively, by the connecting branch for the creation of a fluid channel. The two bends result in the formation of the fluid channels between the respective contact branch and the connecting branch. Said fluid channels can be loaded with a cooling fluid for the cooling of the electrical machine or of the coil. The fluid channels are preferably present as closed-edged channels. For this purpose, the contact branches are shaped in such a way that they come into resting contact, respectively, with the connecting branch with the creation of the fluid channels, so that, as viewed in section, the fluid channel is surrounded completely by the respective contact branch and the connecting branch.

Another preferred embodiment of the invention provides that the first contact branch and/or the second contact branch approach or approaches the connecting branch, as viewed in section, in the direction of its respective free edge, so that, between the turn and another turn resting against the turn, there is another fluid channel. The respective contact branch is therefore directed toward the connecting branch, namely, in the direction of its free edge. Especially preferred, at least in regions, the respective contact branch rests against the connecting branch, so that, as viewed in section, the fluid channel is surrounded in the above-mentioned way.

As a result of the approach of the respective contact branch to the connecting branch, the first bend (in the case of the first contact branch) or the second bend (in the case of the second contact branch) represents an elevation above the other regions of the turn or the point with the largest dimensions in a direction of extension of the coil core, as viewed in section. The direction of extension of the coil core is understood here to mean, in particular, a height of the coil core or an extension of the coil core in the radial direction with respect to the axis of rotation of the rotor.

If a plurality of turns rest against one another, then they are spaced apart from one another by the bends. Accordingly, the additional fluid channel is present, which, on the one hand, is bounded by the turn and, on the other hand, by the additional turn. For example, the additional fluid channel, as viewed in section, is bounded, on the one hand, by the first contact branch or the second contact branch of the turn and, on the other hand, by the connecting branch of the additional turn.

Another embodiment of the invention provides that a plurality of turns are jointly formed by the meandering-shaped metal band. Especially preferred, all turns of the coil winding are formed jointly by the metal band. For this purpose, said metal band is initially processed and subsequently bent around bending axes that are spaced apart from one another and are parallel to one another, wherein, as already stated, a plurality of bending axes are provided per turn.

The processing of the metal bands may be provided separately, for example, prior to the bending, that is, for example, by cutting, machining, or material removal technique. Cutting includes, for example, cutting with shears or punching. Machined processing can take place, for example, by sawing. Material removal can be provided, in turn, thermally, chemically, or electrochemically by erosion and, in particular, by electrical discharge erosion or laser cutting. Electrical discharge erosion can be carried out preferably by wire erosion.

It can be provided that the metal band is coated prior to processing and, in particular, is lacquered and consequently electrically insulated. After the processing, however, it is not necessary to perform a further coating or lacquering. Usually, the non-insulated surface that results from the processing is so small that repeated coating can be dispensed with. In this case, the bending around the bending axes directly follows the processing.

The processing can be performed in such a way that, after the bending around the bending axes, the fluid channel and/or the additional fluid channel is/are present. Said fluid channels are prepared in this case during the processing. This can be done, for example, by cutting and/or reshaping the metal band by punching or pressing, for example. It is also possible to introduce an engraving. It can also be provided, however, that prior to the bending, additional material is applied to the metal band, so, that after the bending, the fluid channel or the additional fluid channel is present.

In another embodiment of the invention, it can be provided that the turns, as viewed in section, differ at least partly in width. Preferably, the width of the turns changes continuously in one direction, so that, for example, two successive turns have respectively different widths. In particular, the increase in the width of the turns occurs continuously over the height of the coil winding, for example, going from a foot of the coil core in the direction of a head of the coil core. Because the coil core usually protrudes outward in the radial direction with respect to the axis of rotation of the rotor, an optimum utilization of space is achieved in this way. The different widths of the turns can be created more preferably in a simple way during the processing of the metal band.

The invention further relates to a method for manufacturing an electrical machine with a rotor and a stator, in particular an electrical machine in accordance with the above statements, wherein the rotor or the stator has at least one coil with a coil core and a coil winding surrounding the coil core. In this case, it is provided that, as viewed in section, the coil winding has at least one turn formed from a flat conductor, which is S-shaped and/or has a meandering shape and, for the reduction of eddy currents, has a plurality of layers, which, at least in regions, are insulated from one another and/or have a plurality of slot-shaped recesses, and, for creation of the turn, is bent around a plurality of bending axes, which are spaced apart from one another and are parallel.

Reference to the advantages of such a design of the electrical machine or of such a method approach has already been made. Both the method and the electrical machine can be further developed in accordance with the above statements, so that, in this regard, reference is made to said statements.

BRIEF DESCRIPTION OF THE DRAWINGS

The invention is explained below in detail on the basis of the exemplary embodiments illustrated in the drawing, without any limitation of the invention thereby ensuing. Shown herein are.

DETAILED DESCRIPTION OF THE DRAWINGS

Figure 1:
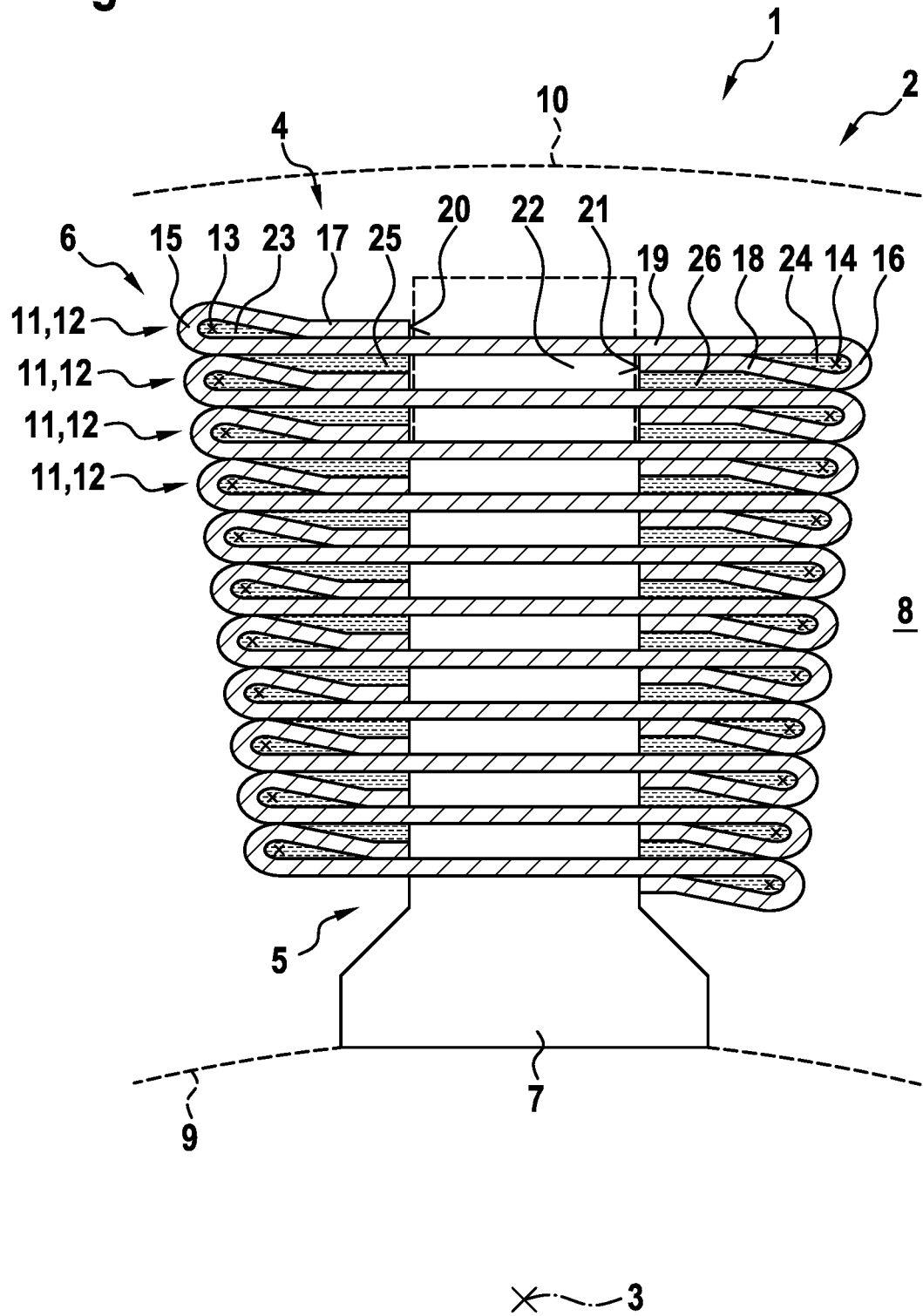
FIG. 1 a schematic cross-sectional illustration through a region of an electrical machine, namely, through a coil that has a coil core and a coil winding, FIG. 2 a schematic illustration of a flat conductor for producing the coil winding in a first embodiment, FIG. 3 a schematic illustration of the flat conductor in a second embodiment, FIG. 4 a schematic illustration of a first variant of the flat conductor, FIG. 5 a schematic illustration of a second variant of the flat conductor, and FIG. 6 a schematic illustration of a third variant of the flat conductor.

FIG. 1 shows a cross section through a region of an electrical machine 1, which has a stator 2 and a rotor, which is not illustrated here. The rotor is mounted rotatably with respect to the stator 2 around an axis of rotation 3. The stator 2 is equipped with at least one coil 4, in particular with a plurality of coils, which are distributed uniformly over its circumference, only one coil of which is illustrated here. The coil 4 is fundamentally composed of a coil core 5 and a coil winding 6. The coil core 5 has—for example, in the area of its foot 7—a thickened region, by means of which it can be fastened in a form-fitting manner to a yoke of the stator 2, which is not illustrated here. With respect to the axis of rotation 3, the coil core 5 protrudes outward in the radial direction.

For cooling of the stator 2 by means of a cooling fluid, the coil 4, preferably together with the yoke, is arranged in a flow channel 8, which is bounded on the inner side in the radial direction and on the outer side in the radial direction, respectively, by a channel wall 9 or 10. The channel walls 9 and 10 are directed preferably continuously in the peripheral direction and correspondingly enclose the flow channel 8 continuously between them. The flow channel 8 can be loaded with the cooling fluid, which flows in the axial direction with respect to the axis of rotation 3 or is directed in the main flow direction in the axial direction.

In order to realize an especially flexible design of the coil 4 and an outstanding cooling, the coil winding 6 has a plurality of turns 11, only a few of which are indicated here by way of example. Each of the turns, respectively, is composed of an S-shaped flat conductor, as viewed in section, or conversely, an S-shaped flat conductor 12, which is present here as a metal sheet The flat conductor 12 is bent, per turn 11, around two bending axes 13 and 14, which are spaced apart from each other and are parallel to each other. The bending results in two bends 15 and 16.

Each turn 11 has a first contact branch 17, a second contact branch 18, and a connecting branch 19. Said branches are indicated for only one of the turns 11. The bend 15 is a part of the first contact branch 17 and the bend 16 is a part of the second contact branch 18. The connecting branch 19 is connected via the bend 15 to the first contact branch 17 and via the bend 16 to the second contact branch 18. The contact branches 17 and 18 are arranged, as viewed in cross section, that is, in the peripheral direction, on opposite-lying sides of the coil core 5. In particular, each of the contact branches 17 and 18 has a free edge 20 or 21, which protrudes in the direction of the coil core 5.

In this case, the respective contact branch 17 or 18 can rest with the corresponding free edge 20 or 21 against the coil core 5. For an S-shaped design of the turn 11, the contact branches 17 and 18 are present, as viewed in the radial direction, on opposite-lying sides of the connecting branch 19. In addition, the connecting branch 19 has a coil core mount 22, which is only rudimentarily indicated here. The connecting branch 19 surrounds the coil core 5 on at least one side as viewed in the axial direction.

The flat conductor 12 is bent in such a way that, in the region of the bends 15 and 16, a fluid channel 23 or 24 is formed between the respective contact branch 17 or 18 and the connecting branch 19. In addition, it can be seen that, for formation of the coil winding 6, a plurality of turns 11 are arranged so as to rest against one another. Because, however, on account of the bends 15 and 16, a kind of thickening of the turns 11 is formed, said turns are spaced apart from one another in the radial direction, at least in regions. Therefore, between adjacent turns 11, there are additional fluid channels 25 and 26. With respect to one of the turns 11, the fluid channel 25, for example, lies outward of this turn 11 in the radial direction and the fluid channel 26 lies inward of said turn in the radial direction.

It was already explained above that usually a plurality of coils 4 are arranged adjacent to one another in the peripheral direction. In order to utilize the available installation space as efficiently as possible, the turns 11 should differ in width, at least in part, as viewed in cross section. In the exemplary embodiment illustrated here, the width of the turns 11, going from the foot 7 of the coil core 5 in the direction of a head of the coil core 5, increases continuously and uniformly.

Figure 2:
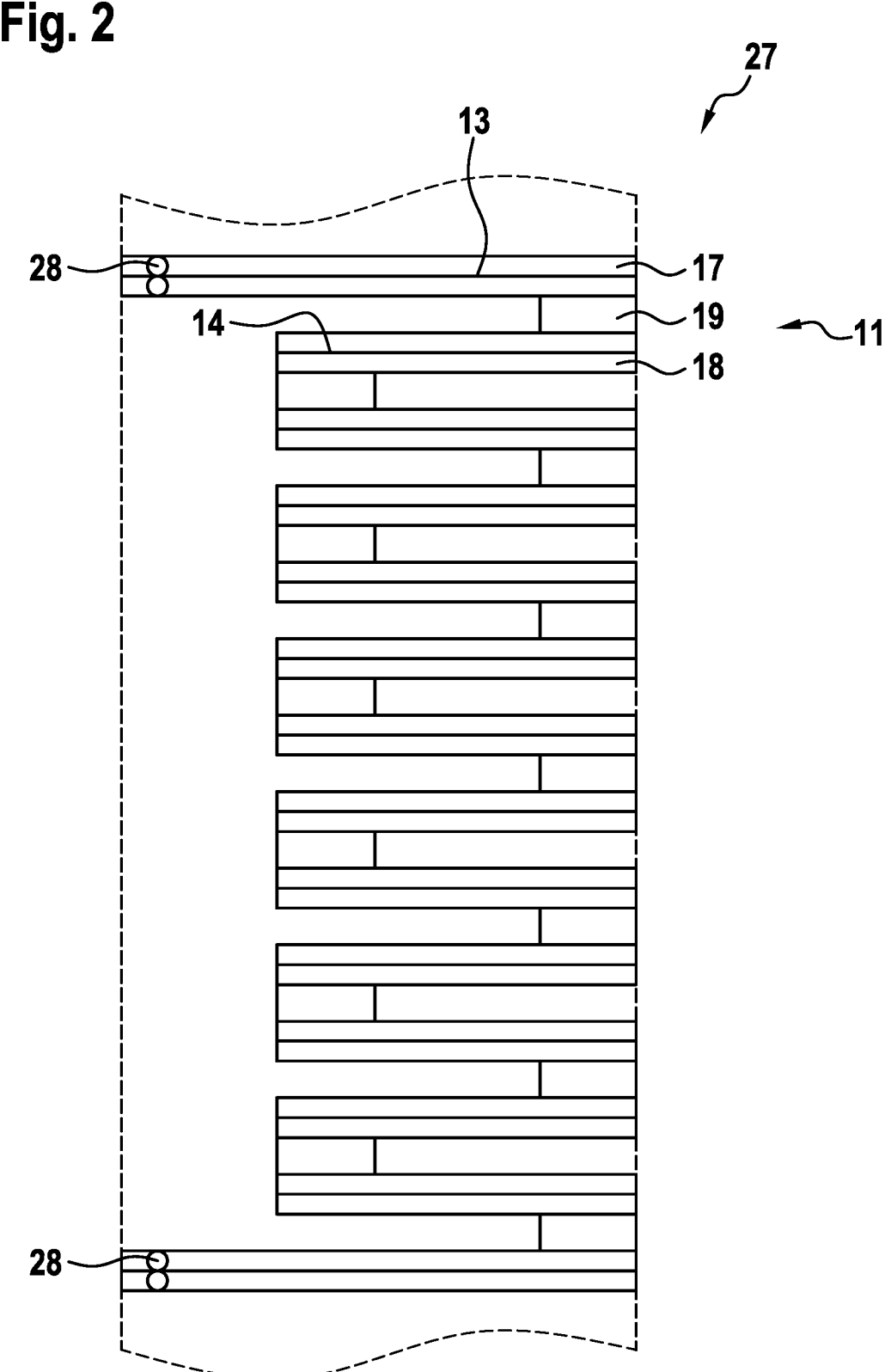

FIG. 2 shows a flat conductor 27, which is formed as a metal band and from which the coil core 5 can be produced. Whereas only the flat conductor 12, made up of the turns 11, was addressed above, the corresponding statements can also be made for the flat conductor 27, so that reference is made to said statements. The flat conductor 27, the original shape of which is only indicated here, was processed in order to make it possible to create the coil 4, consisting of a plurality of turns 11, by bending around the plurality of bending axes 13 and 14. It is readily seen that, for this purpose, the flat conductor 27 is brought into a meandering shape by cutting, for example.

Provided at the beginning and end are terminal lugs 28 for electrical contacting. Also indicated are the contact branches 17 and 18 as well as the connecting branch 19 of one of the turns 11 as well as the bending axes 13 and 14 that are to be realized for the turn 11. If the flat conductor 27 is bent around the bending axes 13 and 14 for each of the turns 11, then there once again results the S-shaped or meandering course, as viewed in cross section, in analogy to the above description.

Figure 3:
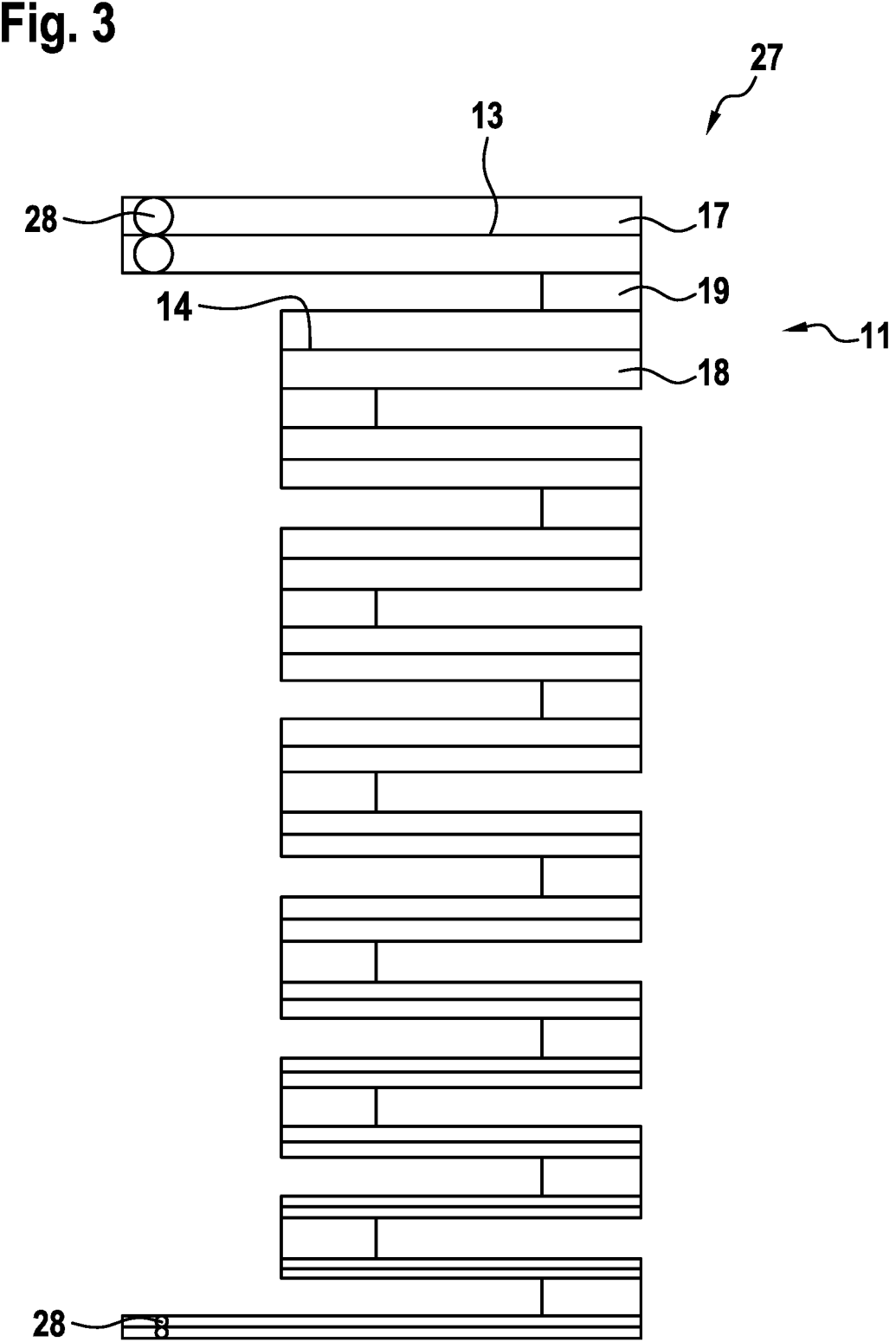

FIG. 3 shows a second embodiment of the flat conductor 27. Reference is made to the above statements. It can be clearly seen that a continuous change in dimensions is present. In this way, it is possible in a simple way to realize the above-described increase in the width of the turns 11.

Figure 4:
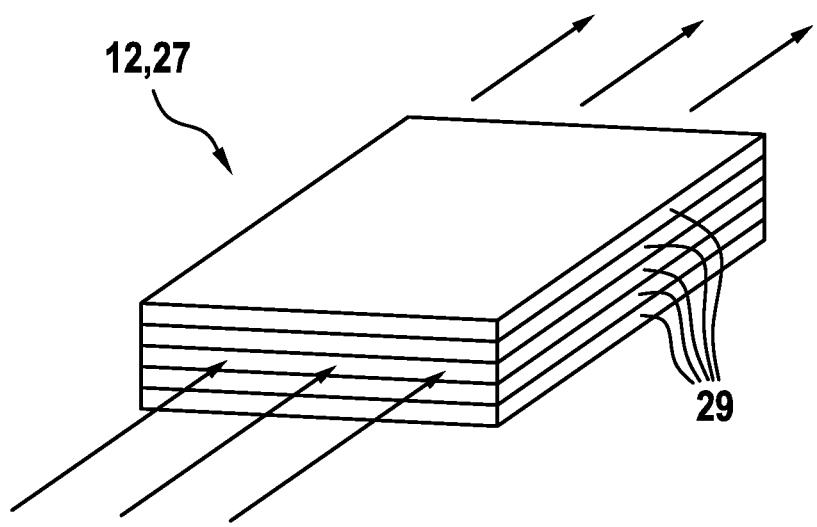

FIG. 4 shows a first variant of the flat conductor 12 or 27. It can be seen that said flat conductor is composed of a plurality of layers 29, which are indicated here only by way of example. The layers 29 are electrically insulated against one another at least in regions. In this way, it is possible to achieve a reduction of eddy currents.

Figure 5:
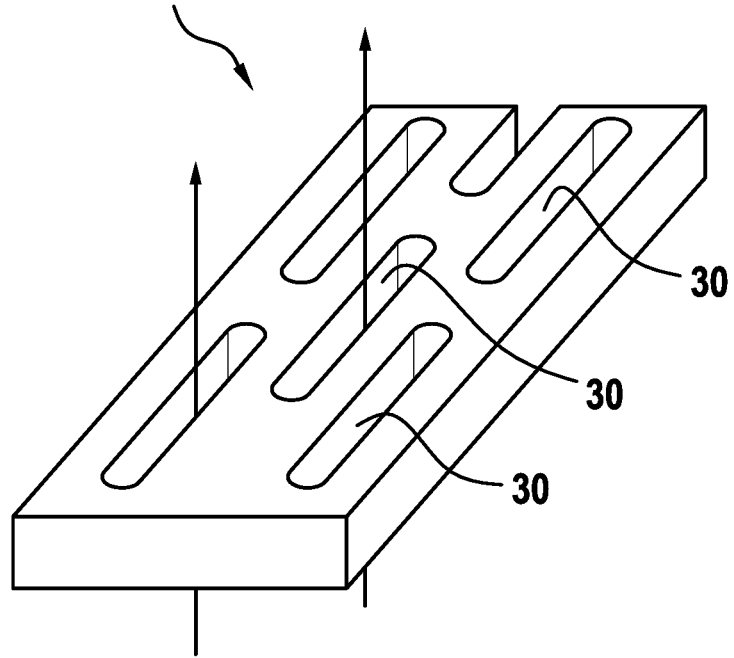

FIG. 5 shows a schematic illustration of a second variant of the flat conductor 12 or 27. It is clear that said flat conductor has a plurality of slot-shaped recesses 30, only a few of which are indicated here by way of example. The recesses 30 are formed with closed edges in the flat conductor 12 or 27 and are shaped as through-passage openings. The latter means that they pass through the flat conductor 12 or 27 completely, that is, pass through, on the one hand, a top side, and, on the other hand, a bottom side.

In the exemplary embodiment illustrated here, the recesses 30 are arranged stacked with respect to one another. This means that, in the longitudinal direction, they are offset against one another at least in part. For example, it is provided, as illustrated here, that two of the recesses 30 are arranged respectively completely adjacent to each other and a third one of the recesses 30 is offset with respect to them in the longitudinal direction, but, passes between them in part, that is, only in part.

Figure 6:
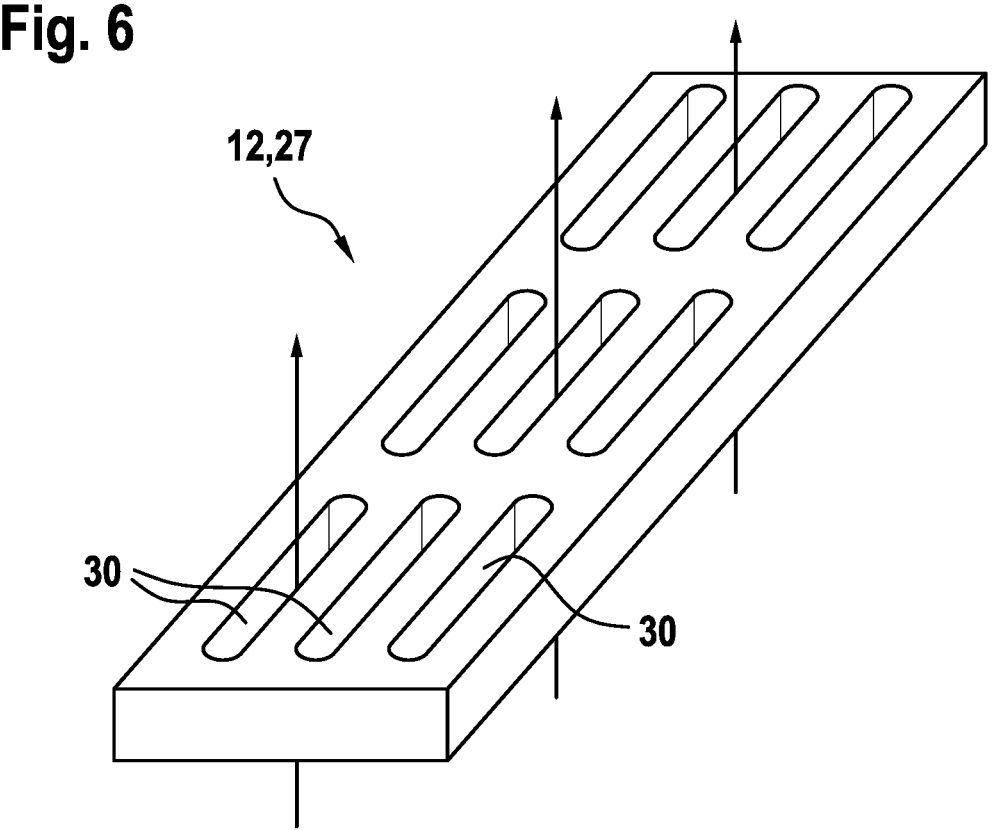

FIG. 6 shows a third variant of the flat conductor 12 or 27. The recesses 30 are shaped in analogy to the preceding statements, so that, in this regard, reference is made to said statements. Only the arrangement of the recesses 30 is different. It can be seen that the recesses 30 are arranged in successive rows, wherein these rows are spaced apart from one another.

Within each row there are a plurality of recesses 30, which are arranged in overlap with one another in the longitudinal direction, namely, preferably completely overlapping. The recesses 30 of each of the rows are preferably aligned respectively with at least one of the recesses 30 of another of the rows. Preferably, each recess 30 of each of the rows is aligned with a recess 30 of each of the other rows.

By means of such an embodiment of the flat conductor 12 or 27, it is possible to suppress eddy currents in it effectively, so that electrical losses of the electrical machine 1 and in particular the heat accruing in said electrical machine can be markedly reduced.

The invention claimed is:

1. An electrical machine, comprising:
   a rotor and a stator, wherein the rotor or the stator has at least one coil with a coil core and a coil winding surrounding the coil core, wherein the coil winding has at least one turn that is formed from a flat conductor bent around a plurality of bending axes, wherein the bending axes are spaced apart from one another and are parallel, and wherein the flat conductor, as a viewed in section, is S-shaped and/or has a meandering shape, wherein, for the reduction of eddy currents, the flat conductor has a plurality of layers insulated from one another, at least in regions, and/or a plurality of slot-shaped recesses;

wherein the turn has a first contact branch, which is arranged on a first side of the coil core and has a free edge that protrudes towards the coil core; a second contact branch, which is arranged on a second side of the coil core, lying opposite to the first side, and has a free edge that protrudes towards the coil core; and a connecting branch that connects the first contact branch and the second contact branch.

2. The electrical machine according to claim 1, wherein the flat conductor is present as a metal sheet or metal band.

3. The electrical machine according to claim 1, wherein the plurality of layers in a first terminal region and in a second terminal region, which is spaced apart from the first terminal region, are electrically connected to one another and, between the first terminal region and the second terminal region, are electrically insulated from one another, at least in regions, continuously.

4. The electrical machine according to claim 1, wherein the plurality of layers are firmly bonded to one another by soldering and/or by adhesive bonding.

5. The electrical machine according to claim 1, wherein the recesses in the flat conductor are formed as closed-edged.

6. The electrical machine according to claim 1, wherein the recesses in the flat conductor are formed as depressions, wherein the depressions pass into a surface of the flat conductor, or as through-passage openings which pass through the flat conductor on both sides.

7. The electrical machine according to claim 1, wherein at least two of the recesses are arranged overlapping in the direction of their longitudinal extension.

8. The electrical machine according to claim 1, wherein the connecting branch is connected to the first contact branch by way of a first bend of the first contact branch and to the second contact branch by way of a second bend of the second contact branch, wherein the first bend and the second bend, are formed, respectively around one of the bending axes.

9. A method for manufacturing an electrical machine with a rotor and a stator, in particular an electrical machine, comprising:

the rotor or the stator has at least one coil with a coil core and a coil winding, which surrounds the coil core, wherein the coil winding has at least one turn, which is formed from a flat conductor and, as viewed in section, the coil winding is S-shaped and/or has a meandering shape, and, for the reduction of eddy currents, wherein the coil winding has a plurality of layers that are insulated from one another, at least in regions, and/or a plurality of slot-shaped recesses and, for the creation of the turn, the flat conductor is bent around a plurality of bending axes, which are spaced apart from one another and are parallel wherein the turn has a first contact branch, which is arranged on a first side of the coil core and has a free edge that protrudes towards the coil core; a second contact branch, which is arranged on a second side of the coil core, lying opposite to the first side, and has a free edge that protrudes towards the coil core; and a connecting branch that connects the first contact branch and the second contact branch.

* * * * *